June 16, 1953 J. W. JONES 2,642,479
DEVICE FOR DETECTING OR MEASURING MAGNETIC FIELDS
Filed Jan. 5, 1948 2 Sheets-Sheet 1
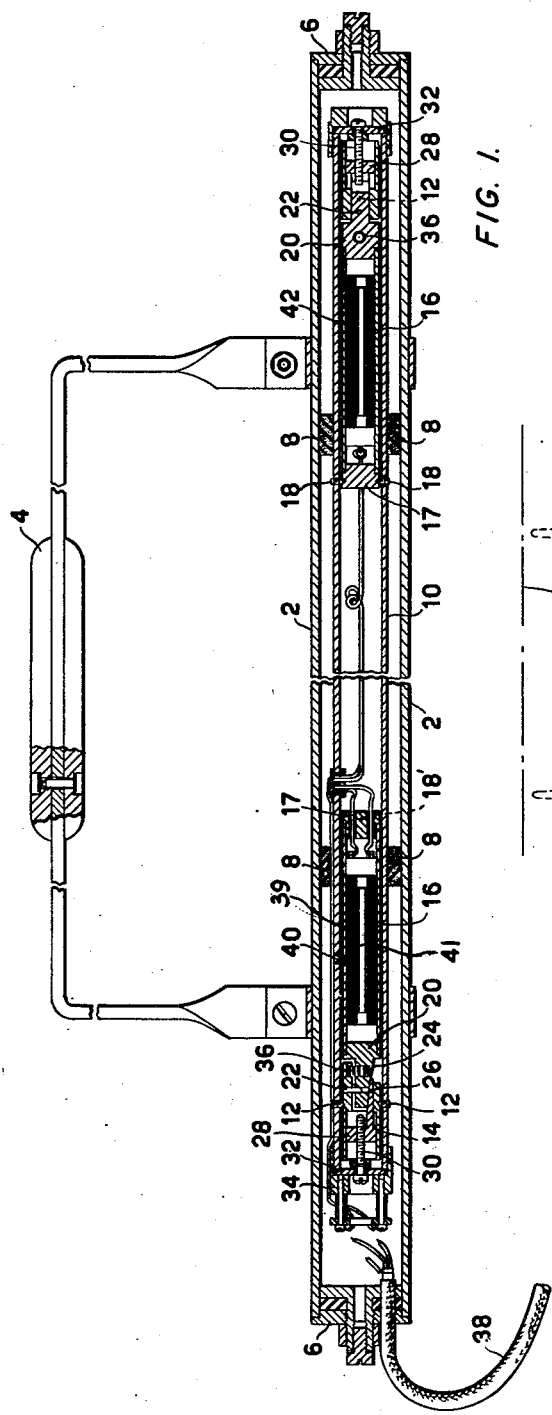
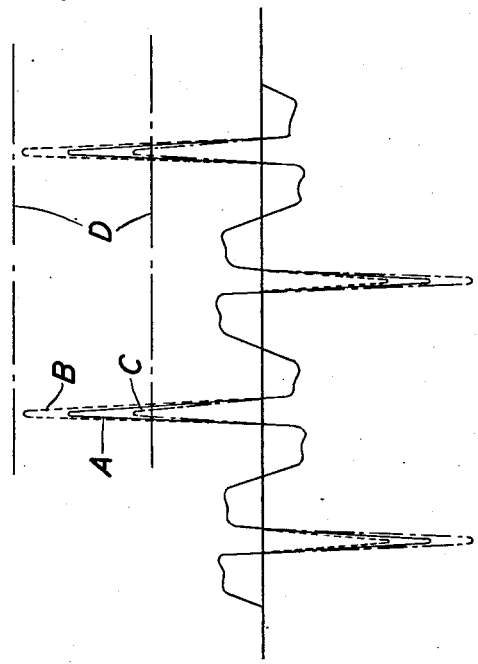
INVENTOR.
JACK WEIR JONES
BY
ATTORNEYS

INVENTOR.
JACK WEIR JONES

Patented June 16, 1953

2,642,479

UNITED STATES PATENT OFFICE 2,642,479

DEVICE FOR DETECTING OR MEASURING MAGNETIC FIELDS

Jack Weir Jones, Chester, Pa., assignor to Sun Oil Company, Philadelphia, Pa., a corporation of New Jersey Application January 5, 1948, Serial No. 488

7 Claims. (Cl. 175—183)

This invention relates to a device of the saturable reactor type for detecting or measuring magnetic fields and has particular reference to a gradiometer or magnetometer of high sensitivity but simple construction.

One of the advantages of the improved gradiometer is that it is portable. Consequently, it is adapted for use, for example, for the location of magnetized devices which are insertible within pipe lines and arranged to be moved therealong by the fluid flow. Such devices, for example, are scrapers, displacers, separators and the like. If these are magnetized the use of a sufficiently sensitive detector on the exterior of the pipe line will permit the location of such a device or will permit recognition of the time of its passing a particular point. The fact that pipe lines, for example, carrying petroleum products are made of steel means that only rather weak magnetic fields are produced exteriorly of the pipe line in the vicinity of a magnetized device inside the line. One specific object of the present invention is the provision of a gradiometer, desirably portable, which will reliably detect the location of such a magnetized device.

The invention, however, is by no means limited to a portable gradiometer or a gradiometer for the use just discussed which merely illustrates the sensitivity obtainable in accordance with the invention. The broad object of the invention is the provision of a gradiometer of improved type which is highly sensitive and simple and reliable in operation.

More specific objects of the invention particularly relating to details of construction and operation will become apparent from the following description read in conjunction with the accompanying drawings in which:

Figure 1 is an axial section through a portable detecting element of the gradiometer;

Figure 3 is a diagram illustrating wave forms produced by the apparatus which are subjected to measurement.

Figure 2:
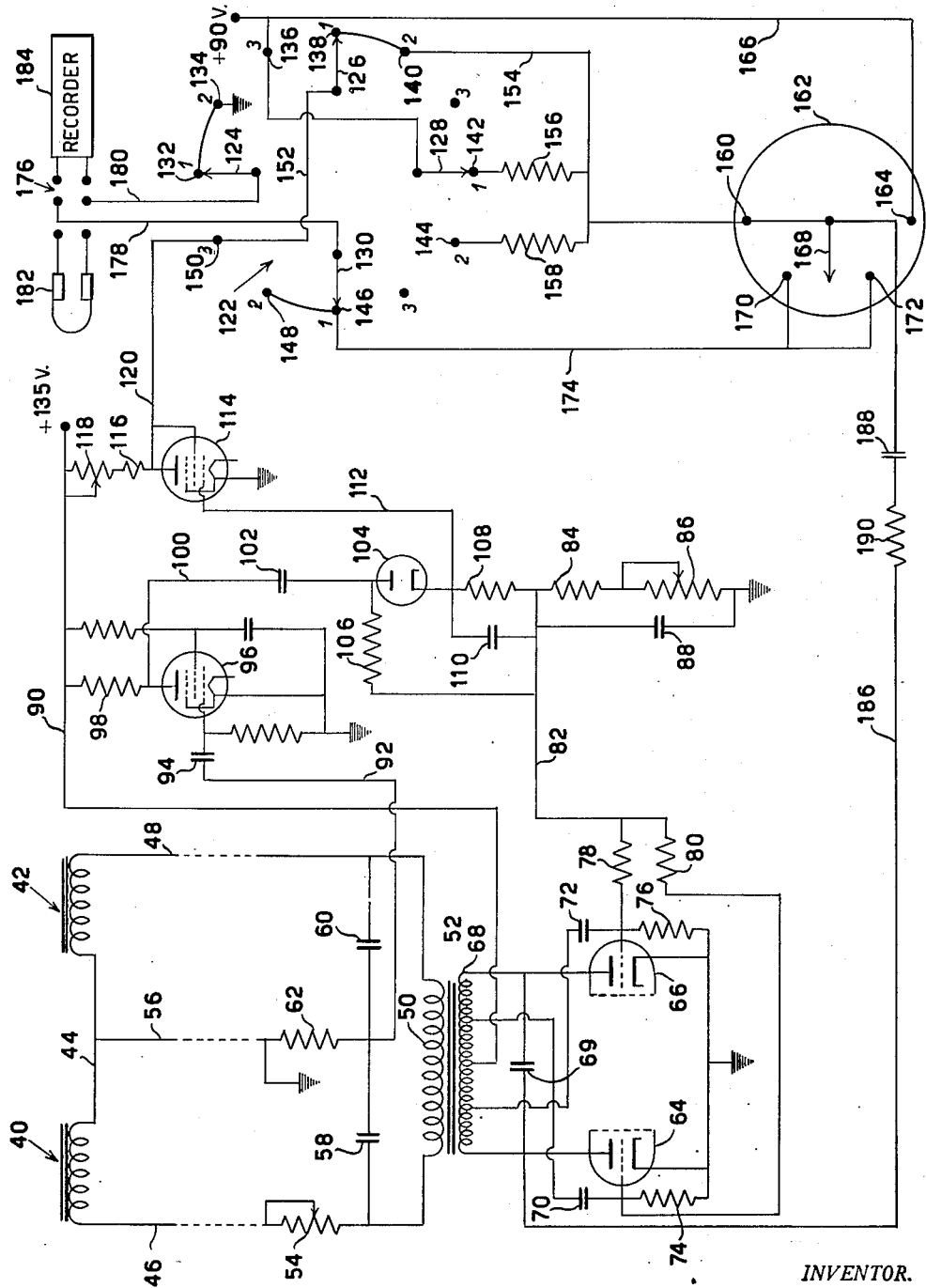
Figure 2 is a wiring diagram illustrating its electrical connections.

Reference will first be made to the mechanical details of Figure 1 which illustrates a portable detector such as may be carried by an observer in the vicinity of a pipe line for the detection of the presence or the passage of magnetized devices, such as magnetized scrapers, within the line. Except as specifically pointed out the parts of this detecting device are of non-magnetic material so as to have no effect on the operation from the standpoint of producing disturbing magnetic fields or distorting ambient fields.

A long tube 2 which may, for example, be of the order of three feet in length, is provided with a carrying handle 4 so that it may be carried in approximately horizontal position by an observer. The ends are closed by end assemblies 6 which, through the inclusion of compressible packing rings, render it water-tight. Through one of these, as illustrated, there extends a shielded cable indicated at 38 which provides electrical connections between interior parts of the detector and electrical apparatus which may be carried in a knapsack by the observer. Sponge rubber rings 8 support an interior tube 10 which serves as a mounting for the detector element assemblies. These assemblies are substantially identical but, as will be evident from Figure 1, are oriented at 90° with respect to each other about the axis of the tube 10. Because of their substantial identity the parts are, in general, indicated by the same reference numerals.

Referring particularly to the left-hand assembly illustrated, a pair of set screws 12 provide a pivotal mounting for a generally tubular member 14 while another pair of set screws, the location of which is indicated at 18' and which correspond to the said screws 18 of the right-hand assembly, provide a pivotal mounting for a head 17 to which is secured a tube 16, the head 20 at the opposite end of which is provided with a sloping surface 24 engaging a wedge 26 projecting through a rectangular opening in the member 14 which prevents its turning. The base 28 of the wedge 26 is internally threaded so that it acts as a nut adjustable in the direction of the axis of tube 10 by a screw 30 which is journalled in a disc 32 clamped to the tube 10 by a cap 34. A pin 22 carried by the member 14 enters an opening in the member 20 to maintain alignment and a powerful spring 36 reacts between the member 14 and member 20 to provide tight engagement between the sloping surface 24 and the wedge 26. The left-hand tube 16 contains the saturable reactor 40 while the right-hand tube contains an identical saturable reactor 42.

These saturable reactors may take various forms but in order to illustrate their nature their construction may be given in some detail. In a specific typical instance each consists of 9000 turns of fine (No. 36) insulated wire forming a solenoid 3 inches long on a saturable core consisting of a single turn of sheet permalloy 0.003 inch thick and about 2½ inches long and about 5/64 inch in diameter with it longitudinal edges slightly overlapped. This core is symmetrically situated in the solenoid so that its ends terminate within the solenoid so that the entire core may be driven to saturation by a system hereafter described.

The solenoid is illustrated at 39 and the core at 41 (the diameter and thickness of the core being, of course, exaggerated).

As will be evident from the mounting of the two saturable reactors adjustment of the screws 30 will serve to permit their adjustment into precise parallelism while their mountings in the ends of the tube 10 will insure that they are substantially on a common axis. It may be noted that an approximate 24 inch spacing between the centers of the reactors has been found satisfactory in practice.

Reference may now be made to Figure 2 which illustrates the electrical connections of the reactors to an oscillator and to the detecting circuits. The ends of the reactor coils are joined by a connection 44 and at this point it may be remarked that the connections are so made that when excited by an oscillator the reactors present opposite magnetic poles toward each other. End connections 46 and 48 are carried through the cable 38, the grounded shield (or third conductor, if unshielded) of which is indicated at 56 and is connected to the junction 44 between the reactors. Connections 46 and 48 run to the ends of a secondary 50 of a transformer 52 there being interposed a variable resistance 54 in one of these for balancing purposes. A pair of condensers 58 and 60, each of small capacity, connect the transformer ends to the line 56 through a resistance 62.

An oscillator of the negative resistance type is constituted by a pair of triodes 64 and 66 arranged in a circuit including, as illustrated, the primary 68 of the transformer 52, the ends of which primary are connected to the anodes of the triodes while taps on the two sides of the center are connected through condensers 70 and 72 to the triode grids in a criss-cross arrangement. The grids are connected to the grounded cathodes through resistors 74 and 76. The transformer 52 is of a step-down type to provide a match between the oscillator and the impedance presented by the reactors. The frequency of the oscillator is a matter of a wide range of choice but in a typical satisfactory arrangement the frequency used was 800 cycles per second. While not essential, it may be noted that the oscillator by reason of its symmetrical construction has substantially no even harmonic output.

Resistors 78 and 80 connect the triode grids to a common line 82 connected to the ungrounded side of a resistance-capacity circuit including the condenser 88 and the fixed and variable resistances 84 and 86, respectively. The flow of grid current in the triodes 64 and 66 during operation serves to maintain the potential of the line 82 negative with respect to ground.

The reactors 40 and 42, condensers 58 and 60 and resistance 62 provide a bridge, the output of which is delivered through the line 92 and condenser 94 to a linear amplifier comprising the tube 96 and its conventional connections. The anode load resistor of this tube is indicated at 98. Positive anode and screen potentials are applied to this tube and to a second amplifying tube 114 as well as to the oscillator anodes through a connection 90 from a high potential source which, for purposes of illustration and comparison with a second high voltage source later to be described, is indicated as +135 volts.

The output of the amplifier 98 is fed through connection 100 including condenser 102 to the anode of a diode detector 104. A resistor 106 connects the anode of this diode to the line 82 while the cathode thereof is connected to the line 82 through a resistance-capacity arrangement consisting of a high resistor 108 shunted by a condenser 110.

As will be clear from the circuit, the arrangement so far described is of a peak voltmeter type providing at the cathode of the diode 104 a direct potential which is a measure of the peak voltage produced by negative swings of the signal applied to the grid of the amplifier tube 96. The actual potential above ground of the cathode of the diode 104 will be the algebraic sum of the constant negative potential in the connection 82 and the peak positive direct potential between this cathode and the connection 82. During operation this cathode potential is maintained negative with respect to ground by suitable adjustment of variable resistor 86 so that a direct current amplifier, comprising the tube 114 the grid of which is connected to the diode cathode through line 112, will not reach either saturation or cut-off, i. e., the grid of this tube 114 is biased to a proper region for optimum operation. The anode of the tube 114 is connected to the high voltage supply line 90 through resistor 116 and a variable resistor 118. Its signals are delivered through the line 120.

A 4-pole, 3-position switch comprises contact arms 124, 126, 128 and 130 which are simultaneously adjustable to three different positions to make contact with a total of twelve contact points, some of which are inactive. The contact points are numbered 1, 2 and 3 to indicate the three alternative positions of this switch. The active contact points are specifically designated 132, 134, 136, 138, 140, 142, 144, 146, 148 and 150. The output from the amplifier tube 114 is fed through the line 120 to the contact 150 and through a connection 152 to the arm 126. Contact points 138 and 140 are connected together and through a connection 154 to corresponding ends of a pair of meter shunts 156 and 158 which are connected respectively to the contact points 142 and 144. The connection 154 is also joined to one terminal 160 of a microammeter 162 of the center zero type. The other terminal 164 of this meter is connected at 166 to a positive voltage source which is indicated as +90 volts. This voltage source is also connected to the contact point 136 and to the arm 128.

The needle 168 of the microammeter is arranged to engage contacts 170 and 172 each located at less than full scale range on opposite sides of zero. These contact points are joined together and through connection 174 to contact points 146 and 148. Contact points 132 and 134 are joined and grounded.

Contact arms 130 and 124 are connected at 178 and 180 to what may be a plug-in socket but which is illustrated as a double-pole double-throw switch 176 so that either an earphone 182 or a recorder 184 may be connected to the lines 178 and 180. There is illustrated at 186 a connection between the oscillator, at the anode of tube 64, and the needle 168, which connection is usually unnecessary but may be provided. In series in this connection are a condenser 188 and a resistor 190. It will be noted that the terminal 160 of the meter is also connected to the needle 168.

In the operation of the gradiometer, let it be assumed, first, that the external magnetic field strength is the same at the locations of both reactors 40 and 42, that is, that there is a zero gradient. The oscillator drives both reactors far beyond saturation and under the assumed zero gradient conditions the output from the bridge would comprise odd harmonics with only a very small component of even harmonics due to residual amplitude unbalance of the bridge. If the circuit were perfectly balanced with perfectly symmetrical elements retaining their values over all portions of a cycle the net output would be zero; however, since such perfect balance is unattainable there will be an actual output but containing substantially only odd harmonics. This output, in general, consists of peaks resulting from unbalance and arising from the saturation conditions of the reactors and, in addition, other components which result from the original oscillator wave input due to unbalance and harmonic distortions of the input wave.

As a matter of fact, as will be made more evident hereafter, it is not desirable to eliminate these odd harmonics and particularly the peaks. They are reduced to a practical extent by an attempt to achieve balance with desirably an output in which the peaks having their origin in the saturation of the reactors are of considerably greater amplitude than the other components of this wave. A desirable type of zero gradient output is indicated in Figure 3 by the solid line curve A.

The existence of a gradient introduces into the output wave even harmonics which appear substantially only at the peaks. For example, as indicated in Figure 3, a positive gradient will distort the zero gradient wave to the wave indicated in dash lines at B. The positive peaks are elongated; the negative peaks are shortened. A negative gradient, on the other hand, results in the opposite condition of a shortening of the positive peaks and a lengthening of the negative peaks as indicated by the dash-dot curve at C. In accordance with the present invention measurement is made of the peak amplitude on one side of this output wave, for example, of the variations which occur in the region between the lines D in Figure 3. The portions of the circuit of Figure 2 following the output from the bridge constitute essentially a peak voltmeter for measuring these changes which, as will be evident, will serve as a quantitative measure of the value of the gradient since the variation in the amplitudes of the peaks will be a function of the value of the gradient. Calibration may, of course, be effected by applying known gradients to the detector.

The tube 96 and its associated parts constitutes merely a linear amplifier for the output wave of the bridge. The following detector tube 104 and its connections produces across the condenser 110 a direct potential which is proportional to the amplitude of the peaks on one side of the amplified output wave of the bridge. The tube 114 and its associated elements is merely a direct current amplifier which provides in the line 120 a direct output varying with the peak amplitudes just mentioned.

It may be here remarked that the effects of variations in oscillator amplitude are prevented from becoming disturbing factors by the circuit arrangement which has been described. The amplitude of oscillations of the oscillator will vary with changes in power supply voltage. These changes will be reflected in a change in the level of the self bias of the oscillator. This bias is taken off through resistors 78 and 80 and is applied to the peak rectifier tube 104. When the amplitude of the oscillations increases, the negative bias of the oscillator also increases and this bias is applied to the rectifier in such a way that the rectified output voltage remains substantially unaltered so far as the oscillation amplitude is concerned.

It may be noted that in the securing of the ultimate direct current signal there is not required any balancing of positive peaks against the negative peaks with associated circuit complications and great simplicity is achieved by causing the measurements to be made in the region of the peaks which substantially exceed the amplitudes of the other wave components of the bridge output. It is to isolate this region for measurement that it is desirable that the unbalance of the circuit should not be completely eliminated, this being in sharp contrast to circuits heretofore disclosed in which very careful balance is necessary to secure practical results.

The direct output from the line 120 may be utilized in numerous ways depending upon the use of the gradiometer. What has been illustrated in Figure 2 is particularly useful in the operation of the gradiometer as a portable instrument for detecting magnetized devices in drill pipes. With the 4-pole switch in the first position illustrated in the drawing and with the phone 182 connected in the circuit, for example, by the proper position of the switch 176 or by an equivalent plug-in arrangement, the operator may carry the detector horizontally along the line. By adjustment of the resistance 118 his apparatus may be initially arranged so that the needle 168 is in zero position for zero gradient condition. Slight gradients will cause the needle 168 to move clockwise or counterclockwise from this position but the amplitudes of such movements, if they are insufficient to cause contact with points 170 and 172, may be disregarded. However, when the needle engages one of these contacts it means that there has been attained a value of the gradient corresponding to the presence of the device which is sought. Under such conditions the phones will be thrown into the circuit and the operator will hear a signal and thus have his attention called to the gradient of interest. Usually the construction of the circuit will be such that a sufficient ripple originating in the oscillator will pass through the line 120 so as to be heard by the operator. However, if this ripple amplitude is too low or it is desired to secure a quite strong signal in the phone there may be provided the connection 186 previously mentioned which feeds the phone directly from the oscillator when a contact is made by the needle.

The second position of the 4-pole switch maintains essentially the same connections but involves shunting the meter 162 with the resistance 158 instead of the resistance 156. These shunts are provided to secure damping and/or to change the sensitivity of the meter.

If actual measurements of the gradient are to be made the switch is moved to the third position and the recorder 184 is connected to the lines 178 and 180. This recorder may be of the commercial type having a built-in preamplifier and designed to provide a record on a chart moved by clockwork. If the operator decides to explore a region of the field the detector may be moved through the field to make a record which may be analyzed. It may be noted that this provision of a recorder is typical of the connection of the output of the device to a recorder for various purposes other than that just described, i. e., for the general measurement of magnetic gradients.

It will be evident that the saturable reactors 40 and 42 may be connected in balanced circuits other than the bridge illustrated with similar output characteristics. Such other circuit are known to the art, and need not be specifically described.

Instead of using saturable reactors, saturable transformers may be used, the primaries of which are energized by an oscillator and the secondaries of which are included in a bridge circuit, or other balanced circuit to provide an output of the general type heretofore described.

It may be noted that merely by changing the relative orientations of the reactors (or transformers) so that their like poles, resulting from excitation, are adjacent to each other, or so that unlike poles are oriented in the same direction if they are side by side, the system may be made to function as a magnetometer, there again resulting peaks which may be measured by the amplifying and detecting systems. In this case the variations in the peak amplitudes will measure the average strength of the field.

What I claim and desire to protect by Letters Patent is:

1. A magnetic field sensing device comprising am impedance bridge having in two of its arms a pair of coils provided with parallel saturable cores and in at least one arm a variable impedance, means providing to said bridge an alternating current of a magnitude producing saturation of said cores, output connections from said bridge, said variable impedance being adjustable to provide under conditions of approximate balance of the bridge an alternating output through said connections having a substantial odd harmonic content characterized by peaks, and a circuit fed by said output connections and giving indications of peak amplitude of only one side of said alternating output, thereby providing a response to variations of an even harmonic content of said output due to variations of the ambient magnetic field threading said cores.

2. A magnetic field sensing device comprising an impedance bridge having in two of its arms a pair of coils provided with parallel saturable cores, means providing to said bridge an alternating current of a magnitude producing saturation of said cores, output connections from said bridge, said bridge, under conditions of approximate balance, providing an alternating output through said connections having a substantial odd harmonic content characterized by peaks, and a circuit fed by said output connections and giving indications of peak amplitude of only one side of said alternating output, thereby providing a response to variations of an even harmonic content of said output due to variations of the ambient magnetic field threading said cores.

3. A magnetic field sensing device comprising an impedance bridge having in two of its arms a pair of coils provided with parallel saturable cores, means providing to said bridge an alternating current of a magnitude producing saturation of said cores, output connections from said bridge, said bridge, under conditions of approximate balance, providing an alternating output through said connections having a substantial odd harmonic content characterized by peaks, and a circuit fed by said output connections and by said alternating current providing means to produce a direct potential substantially independent of variations of amplitude of said alternating current provided to said bridge and variable in accordance with the peak amplitude of only one side of said alternating output, thereby providing a response to variations of an even harmonic content of said output due to variations of the ambient magnetic field threading said cores.

4. A gradiometer comprising an impedance bridge having in two of its arms a pair of coils provided with saturable, axially aligned cores, means providing to said bridge an alternating current of a magnitude producing saturation of said cores, said coils being wound so that adjacent poles of the cores have, at any instant, opposite polarities, output connections from said bridge, said bridge, under conditions of approximate balance, and in the absence of a gradient of the ambient magnetic field, providing an alternating output through said connections having a substantial odd harmonic content characterized by peaks with negligible even harmonic output, and a circuit fed by said output connections and giving indications of peak amplitude of only one side of said alternating output, thereby providing a response to variations of an even harmonic content of said output due to variations of gradient of the ambient magnetic field threading said cores.

5. A gradiometer comprising an impedance bridge having in two of its arms a pair of coils provided with saturable, axially aligned cores, means providing to said bridge an alternating current of a magnitude producing saturation of said cores, said coils being wound so that adjacent poles of the cores have, at any instant, opposite polarities, output connections from said bridge, said bridge, under conditions of approximate balance, and in the absence of a gradient of the ambient magnetic field, providing an alternating output through said connections having a substantial odd harmonic content characterized by peaks with negligible even harmonic output, and a circuit fed by said output connections and by said alternating current providing means to produce a direct potential substantially independent of variations of amplitude of said alternating current provided to said bridge and variable in accordance with the peak amplitude of only one side of said alternating output, thereby providing a response to variations of an even harmonic content of said output due to variations of gradient of the ambient magnetic field threading said cores.

6. A magnetic field sensing device comprising an impedance bridge having in two adjacent arms a pair of coils provided with parallel saturable cores and in its other two arms a pair of condensers, means providing to said bridge at points between said coils and said condensers an alternating current of a magnitude producing saturation of said cores, output connections from the junction of said coils and from the junction of said condensers, said bridge, under conditions of approximate balance, providing an alternating output through said connections having a substantial odd harmonic content characterized by peaks, and a circuit fed by said ouput connections and giving indications of peak amplitude of only one side of said alternating output, thereby providing a response to variations of an even harmonic content of said output due to variations of the ambient magnetic field threading said cores.

7. A magnetic field sensing device comprising an impedance bridge having in two adjacent arms a pair of coils provided with parallel saturable cores and in its other two arms a pair of condensers, and in at least one arm a variable impedance, means providing to said bridge at points between said coils and said condensers an alternating current of a magnitude producing saturation of said cores, output connections from the junction of said coils and from the junction of said condensers, said variable impedance being adjustable to provide under conditions of approximate balance of the bridge an alternating output through said connections having a substantial odd harmonic content characterized by peaks, and a circuit fed by said output connections and giving indications of peak amplitude of only one side of said alternating output, thereby providing a response to variations of an even harmonic content of said output due to variations of the ambient magnetic field threading said cores.

JACK WEIR JONES.

References Cited in the file of this patent

UNITED STATES PATENTS

| Number | Name | Date |
| --- | --- | --- |
| 2,241,499 | Barth | May 13, 1941 |
| 2,315,045 | Breitenstein | Mar. 30, 1943 |
| 2,390,051 | Barth | Dec. 4, 1945 |
| 2,406,870 | Vacquier | Sept. 3, 1946 |
| 2,407,202 | Vacquier | Sept. 3, 1946 |
| 2,412,046 | Hoare | Dec. 3, 1946 |
| 2,459,849 | Stateman | Jan. 25, 1949 |
| 2,480,575 | Hare | Aug. 30, 1949 |
| 2,505,701 | Zuschlag | Apr. 25, 1950 |
| 2,511,564 | Callan | June 13, 1950 |